United States Patent [19]

Pennybaker

[11] Patent Number: 5,218,864
[45] Date of Patent: Jun. 15, 1993

[54] LAYER DENSITY DETERMINATION USING SURFACE AND DEVIATED BOREHOLE GRAVITY VALUES

[75] Inventor: Kent A. Pennybaker, Ponca City, Okla.

[73] Assignee: Conoco Inc., Ponca City, Okla.

[21] Appl. No.: 805,282

[22] Filed: Dec. 10, 1991

[51] Int. Cl.$^5$ .......................... E21B 47/00; G01V 7/00
[52] U.S. Cl. ..................................... 73/152; 73/382 R
[58] Field of Search ..................... 73/151, 152, 382 R, 73/382 G; 166/250; 364/420, 422

[56] References Cited

U.S. PATENT DOCUMENTS

| | | | |
|---|---|---|---|
| 3,576,985 | 5/1971 | Lawrence | 364/420 |
| 4,399,693 | 8/1983 | Gournay | 73/152 |
| 4,419,887 | 12/1983 | Gournay | 73/152 |
| 4,457,168 | 7/1984 | Lautzenhiser | 73/151 |
| 4,475,386 | 10/1984 | Fitch et al. | 73/151 |
| 4,517,836 | 5/1985 | Lyle, Jr. et al. | 73/152 |
| 4,535,625 | 8/1985 | Lyle, Jr. | 73/152 |
| 4,625,547 | 12/1986 | Lyle, Jr. | 73/152 |
| 4,783,742 | 11/1988 | Peters | 364/422 |

Primary Examiner—Hezron E. Williams
Assistant Examiner—Michael Brock

[57] ABSTRACT

Conventional surface gravity measurements, either land, sea, or sea bottom, are made along a line that lies approximately along the same surface orientation as the deviated well. Borehole gravity measurements are made in the deviated part of the well along the wellbore at stations lying approximately below those taken on the surface. The gravity difference is computed from the station pairs. From the gravity difference and the vertical distance between the two readings, the average density is computed for all the station pairs. From a depth model interval depths at each layer between the surface and the borehole stations are computed. The average density between any station pairs can be related to the interval densities and the layer densities are calculated.

7 Claims, 2 Drawing Sheets

LAYER DENSITY DETERMINATION USING SURFACE AND DEVIATED BOREHOLE GRAVITY VALUES

BACKGROUND OF THE INVENTION

1. Field of the Invention

The present invention relates to geological modeling and the determination of layer densities and more particularly to the determination of interval layer densities using conventional surface gravity measurements along with borehole gravity values and computed intermediate layer density values between the wellbore and the surface.

2. Related Prior Art

The present invention solves the problem of uncertainty in conventional surface/borehole gravity modeling. An added constraint is placed on the modeling problem. Given a depth model from seismic, VSP or other sources the layer densities can be computed straight forward.

Prior art has attempted solving the problems associated with conventional surface/borehole gravity modeling by several methods. One way is by modeling using surface gravity values. The layer depths and/or densities are adjusted until the computed gravitational response matched the measured values. In a similar manner, conventional borehole gravity data from a vertical well were used as the constraint to the modeling problem. Prior art has attempted several methods addressing this problem, as listed below.

U.S. Pat. No. 4,399,693, "Applications of Borehole Gravimetric Techniques to Determine Residual Oil Saturation", (Luke S. Gournay), describes a method for borehole gravimetric determination of residual oil saturation of a formation. In an embodiment plural measurements of the local gravity are taken at each of several spaced locations within a well. Those departing more than a statistically determined distance from the mean of the measurements taken at a given location are deemed to be in error and are not used in calculation of the density of the formation at a given point.

U.S. Pat. No. 4,419,887, "Distinguishing True Basement From Dikes and Sills Encountered in Drilling of a Borehole Through the Earth", (Luke S. Gournay), describes how, in drilling the borehole, true basement is distinguished from a dike or sill by logging the borehole with a gravimetric logging tool and with a formation density compensated logging tool. The difference between the density and the gravity, as determined by these logs, is plotted as a function of depth over the interval extending above the point at which the drilling encountered the dense rock formation. The difference log so obtained distinguishes whether rock formation is true basement or a dense intrusion.

U.S. Pat. No. 4,475,386, "Borehole Gravimetry System", (J. L. Fitch, et al.), describes a borehole gravimetry system which employs a pair of pressure transducers for lowering into a borehole along with a borehole gravity meter. The pressure transducers are spaced apart vertically within a pressure sonde for producing a pressure differential measurement of the wellbore fluid. A pressure differential measurement and a gravity reading is taken for each of a plurality of vertical locations within the borehole as the borehole gravimetry system is advanced through the borehole.

U.S. Pat. No. 4,517,836, "Method for Determining Oil Saturation in a Subsurface Formation", (W. D. Lyle, et al.), describes a borehole logging system which includes a borehole gravity meter and a resistivity logging tool. A borehole gravity log and a resistivity log are produced over a select depth interval in a borehole. The bulk density of the subsurface formation surrounding the borehole over the select depth interval is measured from the gravity log. The bulk resistivity of the formation surrounding the borehole over the select depth interval is measured from the resistivity log. The bulk density and bulk resistivity measurements are combined to derive a measurement of the residual oil saturation of the subsurface formation surrounding the borehole for the select depth interval.

U.S. Pat. No. 4,535,625, "Method of Increasing the Vertical Resolution of Well Log Data", (W. D. Lyle), describes a logging technique where measured parameters, which are weighted average measurement values, are inverse filtered to improve the resolution of the measured values. A processing technique is employed, where higher resolution values of logged measurements are obtained from information contained in the measurements themselves, and the response function of a logging tool and without emulating a white noise driven system.

U.S. Pat. No. 4,625,547, "Borehole Gravimetry Logging", (W. D. Lyle, Jr.), relates to a borehole gravimetry survey which is carried out by making gravity measurements at a plurality of measurement stations along an interval of the borehole. A moving average gradient is determined for gravity measurements taken from consecutive pairs of such measurement stations over the borehole interval. Each moving average gradient is inverse filtered to reduce the effect of the weighted averaging on the gravity measurements, thereby increasing the vertical resolution of the data.

U.S. Pat. No. 4,783,742, "Apparatus and Method for Gravity Correction in Borehole Survey Systems", (Rex B. Peters), relates to an inertial navigation borehole survey system where the signals supplied by accelerometers that are contained within the borehole survey system probe are corrected for gravitational gradients encountered as the probe travels through a borehole. The gravity correction is effected in the survey system signal processor and is based on a gravity gradient signal that mathematically corresponds to a predetermined equation. In utilizing the gravitational gradient to generate a gravity correction signal, the signal processor effects a mathematical summation process. The summation range extends from the first signal processing cycle performed during the borehole survey through the final signal processing cycle of the borehole survey operation.

SUMMARY OF THE INVENTION

The present invention describes a method whereby conventional surface gravity measurements are made along with measurements of borehole gravity values in a deviated well. These values are used to calculate the intermediate layer densities between the wellbore and the surface.

Conventional surface gravity measurements, either land, sea, or sea bottom, are made along a line that lies approximately along the same surface orientation as the deviated well. These values are processed in a normal manner to remove tidal, drift, regional, and terrain effects. Borehole gravity measurements are made in the deviated part of the well using a specially modified La Coste and Romberg borehole gravity meter (BHGM). Measurements are made along the wellbore at stations lying approximately below those taken on the surface and are also corrected for tidal, drift, and structural effects. The gravity difference is computed from the station pairs. From the gravity difference and the vertical distance between the two readings, the average density is computed for all the station pairs. From a depth model interval depths at each layer between the surface and the borehole stations are computed. The average density between any station pairs can be related to the interval densities. In this process, densities are assumed not to change laterally and thus, the average density is a function of interval depths. The intermediate layer densities are then calculated.

DESCRIPTION OF THE PREFERRED EMBODIMENT

This invention describes a method whereby conventional surface gravity measurements are made along with measurements of borehole gravity values in a deviated well and the values used in the computation of intermediate layer densities between the wellbore and the surface.

Figure 1:
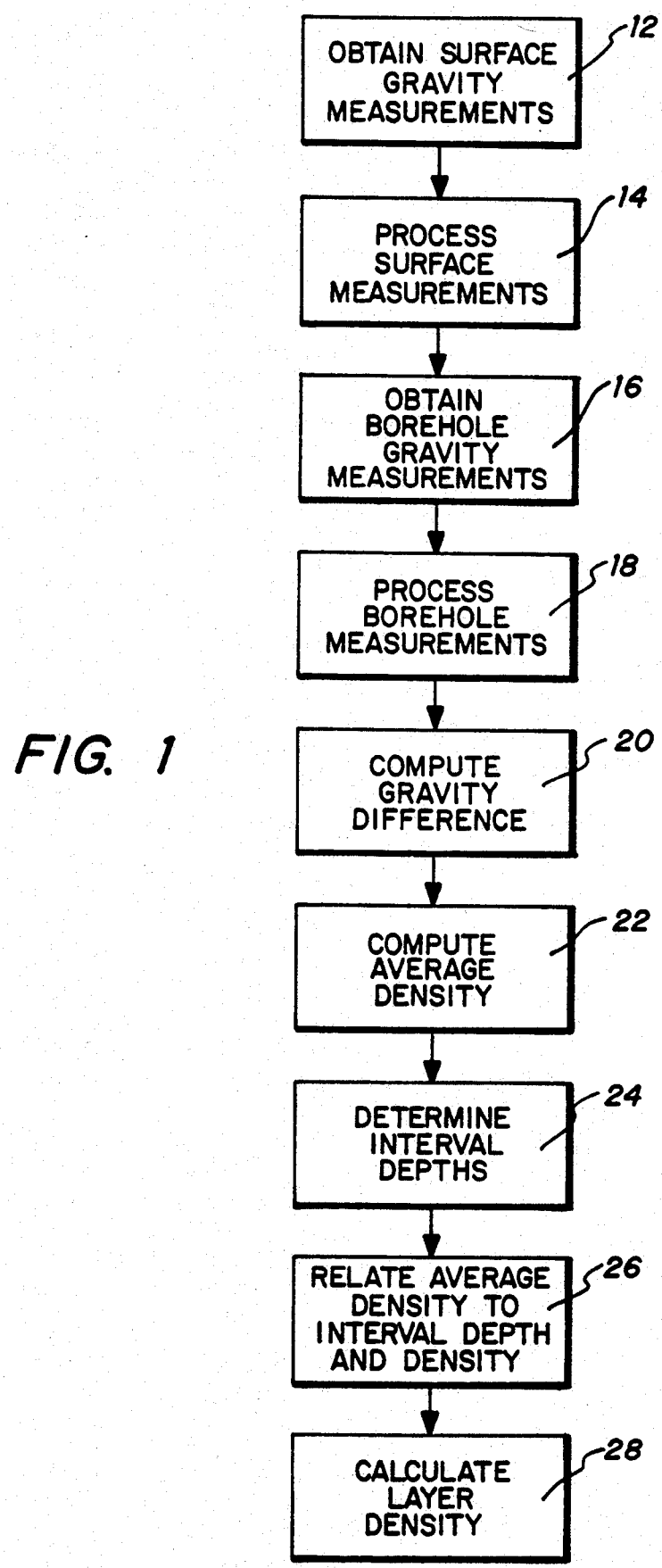
FIG. 1 is a flow chart illustrating the method of the present invention in block form.

Referring now to FIG. 1, a flow chart of the present invention is illustrated in block form.

At block 12 conventional surface gravity measurements are taken. In the preferred embodiment conventional surface gravity measurements, either land, sea, or sea bottom, are made along a line that lies approximately along the same surface orientation as the deviated well. These values preferably are processed in a normal manner to remove tidal, drift, regional, and terrain effects at block 14. In the alternative, the conventional gravity measurements may be supplied from previous surveys, however, this sometimes presents problems in locating the position relevant to the deviated well bore.

At block 16 borehole gravity measurements are made in the deviated part of the well. The preferred embodiment uses a specially modified La Coste and Romberg borehole gravity meter (BHGM). The La Coste and Romberg borehole gravity meter is modified so that it can be leveled and read in the highly deviated part of the wellbore. The current operation of the La Coste and Romberg (L&R) BHGM is limited to approximately 15 degrees of deviation from the vertical. The L&R BHGM must be modified in such a way so that it can take readings in deviated wellbores up to approximately 90 degrees. In one possible modification, the side rails of the borehole gravity meter would be cut and expanded and the element placed in a larger sonde to allow the element to be turned 90 degrees within the wellbore. The cross level worm screw of the BHGM would be lengthened to allow the element to move to a position where it could be suspended at 90 degrees within the larger sonde and side rails. To allow free unobstructed suspension of the element in the vertical plane the element hinge piece would also have to be lengthened. The cross and rotate motors and gears would be modified to handle the larger cross worm screw and wider side rails. Measurements are made along the wellbore at stations lying approximately below those taken on the surface (see FIG. 2). These measurements are processed in a normal manner to remove tidal, drift, and structural effects at block 18.

The gravity difference ($\Delta g$) is computed at block 20 from the station pairs (surface and borehole readings at approximately the same mappable location). From the gravity difference and the vertical distance between the two readings, the average density is computed at block 22.

The following formula illustrates how the average density, Pavg is computed.

$$Pavg = 3.682 - 39.127 \left[ \frac{\Delta g}{\Delta Z} \right]$$

The densities are computed for all the station pairs.

Figure 2:
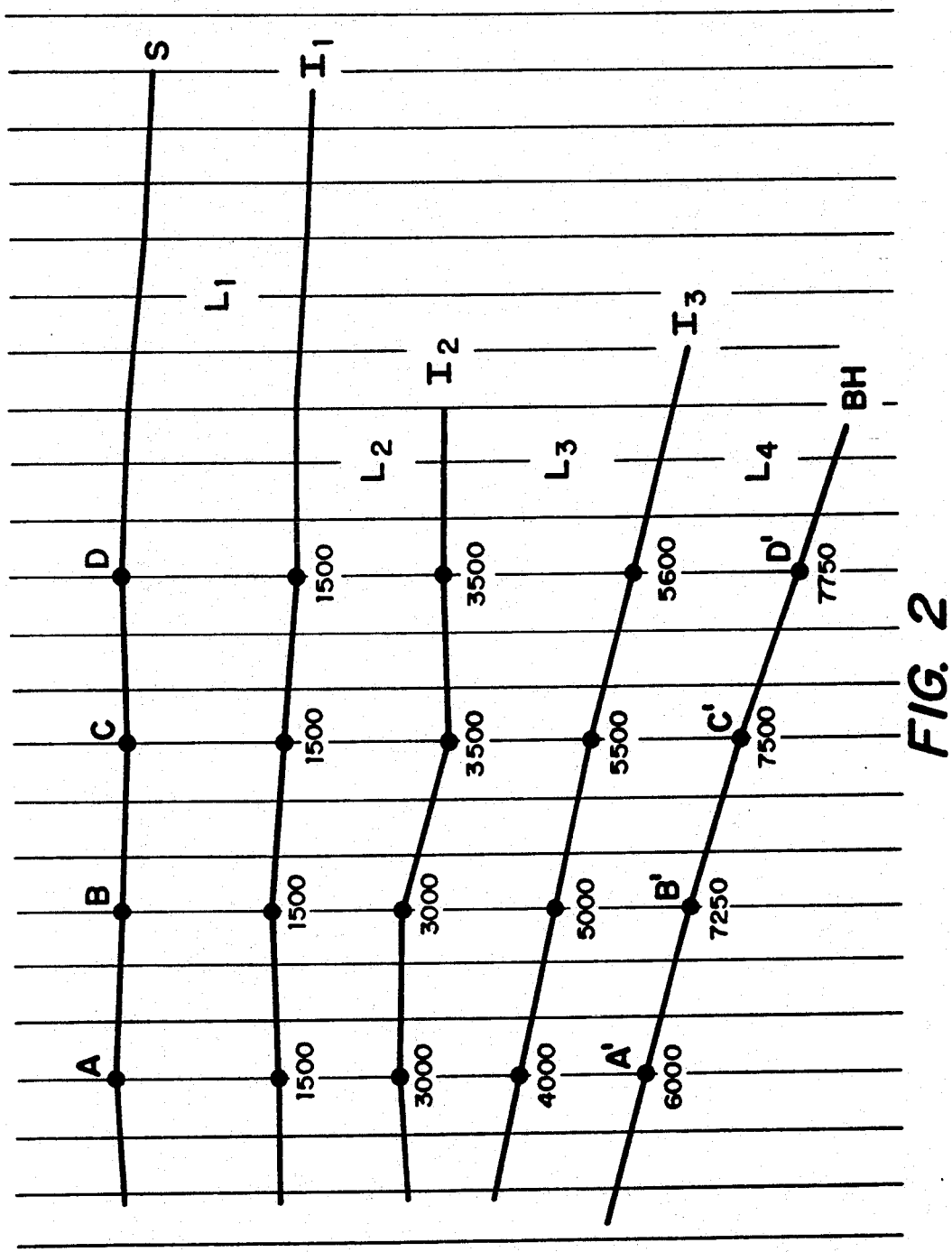
FIG. 2 is an example depth model illustrating a deviated wellbore and locations at which gravity measurements may be taken.

An example depth model is illustrated in FIG. 2 as having a surface S, interfaces $I_1$, $I_2$, $I_3$ and deviated borehole BH with layers $L_1$, $L_2$, $L_3$ and $L_4$ as the areas directly above each of the interfaces and borehole. From the depth model of FIG. 2 interval depths at each layer between the surface and the borehole stations are computed. For example, the depth at measurement points A, B, C and D between the surface S and interface $I_1$ is illustrated as 1500 meters. Similarly, $I_2$ is illustrated at a depth of 3000 meters at points A and B while dropping down to 3500 meters at points C and D. Interface $I_3$ is illustrated as occurring at depths of 4000 meters, 5000 meters, 5500 meters and 5600 meters at points A, B, C and D respectively. A deviated borehole BH is illustrated as having measurement stations A', B', C' and D' at depths of 6000 meters, 7250 meters, 7500 meters and 7750 meters respectively. Measurement stations A', B', C' and D' lie in a position approximately below measurement points A, B, C and D and comprise what is referred to as a station pair. At block 24, the interval depths at each layer are determined.

At block 26 the average densities are related to the interval density and depth of each interface. The average density between any station pairs can be related to the interval densities and depths as follows:

$$Pavg = (P_1 \Delta Z_1 + P_2 \Delta Z_2 + \ldots P_n \Delta Z_n)/Z$$

It is assumed that the layer densities do not change laterally, and the Pavg of each station is a function of the interval depths at that location. For each station then, the average density can be represented as follows:

$$P_1 \, avg = (P_1 \Delta Z_{11} + P_2 \Delta Z_{21} + \ldots P_n \Delta Z_{n1})/Z_1$$

$$P_2 \, avg = (P_1 \Delta Z_{12} + P_2 \Delta Z_{22} + \ldots P_n \Delta Z_{n2})/Z_2$$

$$P_n \, avg = (P_1 \Delta Z_{1n} + P_2 \Delta Z_{2n} + \ldots P_n \Delta Z_{nn})/Z_1$$

These equations can be placed in matrix form.

$$\begin{bmatrix} \Delta Z_{11} & \Delta Z_{12} & \ldots & \Delta Z_{1n} \\ \Delta Z_{21} & \Delta Z_{22} & \ldots & \Delta Z_{2n} \\ \Delta Z_{n1} & \Delta Z_{n2} & \ldots & \Delta Z_{nn} \end{bmatrix} \begin{bmatrix} P_1 \\ P_2 \\ P_n \end{bmatrix} = \begin{bmatrix} P_1 avg \, Z_1 \\ P_2 avg \, Z_2 \\ P_n avg \, Z_n \end{bmatrix}$$

Simplified, this can be restated as:

$$Ax = B$$

The layer densities, x, are obtained at block 28 by taking the inverse of A and multiplying with B:

$$x = A^{-1}B$$

For the example model given in FIG. 2, the following Pavg values were assumed.

$P_1$ avg = 2.36

$P_2$ avg = 2.45

$P_3$ avg = 2.43

$P_4$ avg = 2.45

Using the above P avg values and the depths illustrated in FIG. 2, the following matrix was set up.

$$\begin{bmatrix} 1500 & 1500 & 1000 & 2000 \\ 1500 & 1500 & 2000 & 2250 \\ 1500 & 2000 & 2000 & 2000 \\ 1500 & 2000 & 2100 & 2150 \end{bmatrix} \begin{bmatrix} P_1 \\ P_2 \\ P_3 \\ P_4 \end{bmatrix} = \begin{bmatrix} 14160 \\ 17762.5 \\ 18225.0 \\ 18987.5 \end{bmatrix}$$

The layer densities were computed as follows:

$P_1 = 2.06$ $P_2 = 2.58$ $P_3 = 2.92$ $P_4 = 2.13$

This procedure was checked for sensitivity to errors in the depth model (interval depths). A ten percent error was applied to a single point ($\Delta Z_{13} = 1100$) and to an entire layer ($\Delta Z_{13} =, 1100, \Delta Z_{23} = 2200, \Delta Z_{33} = 2200, \Delta Z_{43} = 2300$). The results are tabulated below:

| Layer | Originally Computed Layer Density | Density w/ 1 point 10% Off. in Depth | Density w/ Entire Layer 10% off |
|---|---|---|---|
| 1 | 2.06 | 2.06 | 2.00 |
| 2 | 2.58 | 2.56 | 2.61 |
| 3 | 2.92 | 3.00 | 2.88 |
| 4 | 2.13 | 2.08 | 2.16 |

The method of the present invention will aid in the geological/geophysical interpretation near a wellbore that has been drilled with a large horizontal deviation (horizontal well).

The advantages come in many forms, some of which are very easily understood. First, layer densities which can be used in seismic and VSP processing are calculated. Second, formation densities are obtained which cover a large volume of reservoir rock upon which more representative porosity and water saturation calculations can be made. Comparison of computed layer densities to vertical borehole gravity densities can be obtained to aid in the interpretation of an undefined layer boundary or distant geological structure (i.e. fault, salt dome, etc.).

However it is important to note that the following limitations apply. First, a homogeneous layer of constant lateral density must be assumed. And, second, the nearby structure must be relatively simple to avoid adverse structural effects on the gravity readings.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method for providing the intermediate layer densities between the wellbore of a deviated well and the surface in a multi layer geological structure comprising the steps of:

obtaining conventional surface gravity measurements along a line that lies approximately along the same surface orientation as the deviated well;

making borehole gravity measurements in the deviated part of the well along the wellbore at stations lying approximately below those taken on the surface;

correlating said conventional gravity measurements and said borehole gravity measurements to form station pair measurements;

computing the gravity difference for each station pair from said station pair measurements;

determining the average density for all the station pairs from the gravity difference and the vertical distance between the two readings;

obtaining interval depths at each layer between the surface and the borehole stations from a depth model; and calculating an interval layer density from the average density between the two points in each station pair and their relation to the interval densities.

2. The method for providing the intermediate layer densities between the wellbore of a deviated well and the surface in a multi layer geological structure according to claim 1 wherein said step of making borehole gravity measurements includes the step of:

modifying a La Coste and Romberg borehole gravity meter so that it can be leveled and read in the highly deviated part of the wellbore.

3. The method for providing the intermediate layer densities between the wellbore of a deviated well and the surface in a multi layer geological structure according to claim 1 wherein said step of obtaining conventional gravity measurements includes the steps of:

designating specific locations spaced apart a predetermined distance; and performing conventional gravity measurements at said specific locations.

4. The method for providing the intermediate layer densities between the wellbore of a deviated well and the surface in a multi layer geological structure according to claim 1 wherein said step of obtaining conventional gravity measurements includes the steps of:

receiving conventional gravity measurements; and identifying the locations at which said conventional gravity measurements were made.

5. The method for providing the intermediate layer densities between the wellbore of a deviated well and the surface in a multi layer geological structure according to claim 1 wherein said step of determining the average density for all the station pairs includes the step of:

calculating the average density according to the formula:

$$P_{avg} = 3.682 - 39.127 \left[ \frac{\Delta g}{\Delta Z} \right]$$

where $\Delta g$ is the gravity difference between said surface gravity measurement and said borehole gravity measurement and $\Delta Z$ is the depth of said station at which said borehole gravity measurement is taken.

6. The method for providing the intermediate layer densities between the wellbore of a deviated well and the surface in a multi layer geological structure according to claim 1 wherein said step of calculating the layer density includes the step of:

calculating the layer density according to the formula:

$$\begin{bmatrix} \Delta Z_{11} & \Delta Z_{12} & \dots & \Delta Z_{1n} \\ \Delta Z_{21} & \Delta Z_{22} & \dots & \Delta Z_{2n} \\ \Delta Z_{n1} & \Delta Z_{n2} & \dots & \Delta Z_{nn} \end{bmatrix} \begin{bmatrix} P_1 \\ P_2 \\ P_n \end{bmatrix} = \begin{bmatrix} P_1 avg\ Z_1 \\ P_2 avg\ Z_2 \\ P_n avg\ Z_n \end{bmatrix}$$

where $P_1 avg, P_2 avg, \dots P_n avg$ are average densities for the station pairs,
$Z_1, Z_2, \dots Z_n$ are layer depths,
$P_1, P_2, \dots P_n$ are interval layer densities and
$\Delta Z_{11}, Z_{12}, \dots \Delta Z_{nn}$ are interval depths related to surface borehole locations.

7. A method for providing the intermediate layer densities between the wellbore of a deviated well and the surface in a multi layer geological structure comprising the steps of:

obtaining conventional surface gravity measurements along a line that lies approximately along the same surface orientation as the deviated well by designating specific locations spaced apart a predetermined distance and performing conventional gravity measurements at said specific locations;

making borehole gravity measurements in the deviated part of the well along the wellbore at stations lying approximately below those taken on the surface using a modified La Coste and Romberg borehole gravity meter so that it can be leveled and read in the highly deviated part of the wellbore;

correlating said conventional gravity measurements and said borehole gravity measurements to form station pair measurements;

computing the gravity difference for each station pair from said station pair measurements;

determining the average density for all the station pairs from the gravity difference and the vertical distance between the two readings;

obtaining interval depths at each layer between the surface and the borehole stations from a depth model; and calculating an interval layer density from the average density between the two points in each station pair and their relation to the interval densities.

* * * * *

UNITED STATES PATENT AND TRADEMARK OFFICE
CERTIFICATE OF CORRECTION

PATENT NO. : 5,218,864
DATED : June 15, 1993
INVENTOR(S) : Kent A. Pennybaker

It is certified that error appears in the above-identified patent and that said Letters Patent is hereby corrected as shown below:

Column 4, line 57,

"$P_n \text{ avg} = (P_1 \Delta Z_{1n} + P_2 \Delta Z_{2n} + \ldots P_n \Delta Z_{nn}/Z_1$" should be --$P_n \text{ avg} = (P_1 \Delta Z_{1n} + P_2 \Delta Z_{2n} + \ldots P_n \Delta Z_{nn}/Z_n$--.

Signed and Sealed this

Twenty-fifth Day of January, 1994

Attest:

BRUCE LEHMAN

*Attesting Officer*   *Commissioner of Patents and Trademarks*